United States Patent [19]
Schulz

[11] Patent Number: 6,073,952
[45] Date of Patent: Jun. 13, 2000

[54] SEMITRAILER FIFTH WHEEL COUPLING PIN FOR SEMITRAILER AND ATTACHMENT ARRANGEMENT

[76] Inventor: Gerd Schulz, Danzinger Strasse 2, D-34289 Zierenberg, Germany

[21] Appl. No.: 09/051,331

[22] PCT Filed: Oct. 11, 1996

[86] PCT No.: PCT/EP96/04437

§ 371 Date: Apr. 8, 1998

§ 102(e) Date: Apr. 8, 1998

[87] PCT Pub. No.: WO97/14605

PCT Pub. Date: Apr. 24, 1997

[30] Foreign Application Priority Data

Oct. 14, 1995 [DE] Germany ............ 195 38 307

[51] Int. Cl.[7] .................................. B62D 53/08
[52] U.S. Cl. ............................. 280/433; 280/491.5
[58] Field of Search ................... 280/433, 515, 280/416.1, 418, 415.1, 423.1, 491.1, 491.5, 507; 403/365, 369, 368, 371, 377

[56] References Cited

U.S. PATENT DOCUMENTS

| | | |
|---|---|---|
| 3,452,633 | 7/1969 | Hammon. |
| 3,600,005 | 8/1969 | Glaza ............................ 280/433 |
| 3,807,765 | 4/1974 | Pokornicki ..................... 280/433 |
| 3,807,766 | 4/1974 | Pleier et al. ................... 280/433 |
| 3,870,342 | 3/1975 | Baxter et al. .................. 280/433 |
| 4,254,967 | 3/1981 | Scanlon ......................... 280/433 |

FOREIGN PATENT DOCUMENTS

| | | | |
|---|---|---|---|
| 214723 | 5/1958 | Australia | 280/433 |
| 1680256 | 8/1971 | Germany | 280/433 |
| 3744307 | 7/1989 | Germany | 280/433 |

*Primary Examiner*—Anne Marie Boehler
*Attorney, Agent, or Firm*—Michael J. Striker

[57] ABSTRACT

A fifth wheel coupling pin (1) for semitrailers, for connecting a semitrailer (2) to the fifth wheel of a tractor-trailer, has a coupling portion (3) for locking into the fifth wheel in detent fashion, a support portion (4) for insertion into a receiving opening (12) of the semitrailer (2), and a securing portion (5) for securing the fifth wheel coupling pin (1) against falling axially out of the receiving opening (12). The securing portion (5) is provided with a lateral annular groove (6) for engagement of a securing body (14) of the semitrailer (2).

19 Claims, 3 Drawing Sheets

SEMITRAILER FIFTH WHEEL COUPLING PIN FOR SEMITRAILER AND ATTACHMENT ARRANGEMENT

BACKGROUND OF THE INVENTION

The invention relates to a fifth wheel coupling pin for semitrailers, for connecting the semitrailer to the fifth wheel of a tractor-trailer, having a coupling portion for locking in detent fashion into the fifth wheel, having a support portion for insertion into a receiving opening of the semitrailer that has support faces, and having a securing portion for securing the fifth wheel coupling pin against falling axially out of the receiving opening. The invention also relates to an attachment arrangement for attaching fifth wheel coupling pins to semitrailers, having a housing attached, preferably welded, to the semitrailer, which housing has a continuous, preferably conical receiving opening for receiving a support portion of the fifth wheel coupling pin, and a securing portion of the fifth wheel coupling pin protrudes out of the top of the housing oriented toward the semitrailer.

For connecting a tractor-trailer to a semitrailer, a coupling arrangement is used, comprising a coupling cradle, mounted on the tractor, with an introduction slot and securing means and with a so-called fifth wheel coupling pin or kingpin, which is secured to the semitrailer. To achieve the greatest possible compatibility between tractor-trailers and semitrailers, the dimensions of the insertion slot and of the kingpin body are standardized, for instance under DIN Standard 47080 or ISO Standard 337.

In known embodiments, the fifth wheel coupling pin comprises a standardized coupling portion, a conical support portion, and a securing portion embodied as a thread. Known attachment arrangements have a housing, which is firmly welded to the semitrailer, and a conical bore into which the fifth wheel coupling pin is inserted from below. The conical support portion of the fifth wheel coupling pin rests on the conical opening of complementary shape, so that essentially radially oriented tensile forces of the tractor or torques and essentially axially oriented forces of gravity of the semitrailer can be transmitted.

To secure the fifth wheel coupling pin against falling out axially, a castellated nut is screwed onto the thread of the securing portion that protrudes upward out of the opening into the interior of the semitrailer, and the castellated nut in turn is secured by means of a cotter pin relative to the kingpin body. During vehicle operation, fifth wheel coupling pins undergo a certain wear, so that they have to be replaced from time to time. In the known embodiment, this requires taking off the cotter pin securing means and the castellated nut, and then the worn fifth wheel coupling pin can be removed from its base and replaced. A disadvantage of the known embodiment is that castellated nut can be loosened only from the inside of the semitrailer, and additionally that the cotter pin securing means must be removed and reinstalled. Yet the cotter pin securing means cannot be omitted, because an unsecured castellated nut could come loose during vehicle operation as a consequence of slight motions of a worn fifth wheel coupling pin.

SUMMARY OF THE INVENTION

The object of the invention is to provide a fifth wheel coupling pin, and an attachment arrangement that assures simple mounting and secure attachment of the fifth wheel coupling pin.

The object is attained in that the securing portion of the fifth wheel coupling pin has at least one lateral recess for the form-locking engagement of a securing body of the semitrailer. The fifth wheel coupling pin of the invention can be attached in a simple, secure way by an attachment arrangement on the semitrailer in that a clamping body is screwed onto the inside of the housing and encloses the securing portion with a clamping opening that narrows toward the face end of the fifth wheel coupling pin, and at least one securing body is clamped in place between an inner wall of the clamping opening and a lateral recess of the securing portion.

In the arrangement according to the invention, the fifth wheel coupling pin can no longer come unscrewed out of the housing, because it is prevented from falling out not by a castellated nut but rather by a securing body that is clamped in place. Although the clamping body is tightly screwed in the arrangement of the invention, nevertheless the screws used for this purpose cannot be loosened by rotation of the fifth wheel coupling pin. Along with the direct radial and axial support in the receiving opening of the housing the fifth wheel coupling pin of the invention is also supported in the radial direction on the housing via the securing body and the clamping body. The fastening screws are not burdened by the supporting forces, however. For this reason if no other, the fastening screws will not come loose on their own during vehicle operation.

In an advantageous embodiment, the fifth wheel coupling pin is embodied substantially rotationally symmetrically, and has a conically shaped support portion. Because of the conical shape of the support portion, the conical support faces, resting on one another, of the support portion and the receiving opening and the radial tensile forces or torques brought to bear by the tractor-trailer as well as the axially oriented forces of gravity of the semitrailer can be supported. Moreover, this arrangement assures an especially firm seat of the fifth wheel coupling pin in the receiving opening.

In a simple embodiment, an encompassing annular groove is provided as the lateral recess. Such an annular groove can be made especially simply in the course of the manufacture of the fifth wheel coupling pin. Moreover, the disposition of an annular groove enables an especially space-saving embodiment of the securing portion, which can be very much shorter in the axial direction than if it had to carry a large castellated nut. A fifth wheel coupling pin according to the invention is thus advantageously embodied with an especially short structure, so that it does not protrude as far into the interior of the semitrailer.

By the provision that the groove walls are formed by two conical portions, so that the annular groove takes the form of a constriction, a simple clamping in place of a securing body into the annular groove in the radial direction is assured, and the securing body is disposed in such a way that it will not rattle.

The invention can be improved further by the provision that a nonrotationally symmetrical recess for engagement by a torsion securing means is provided on the face end of the securing portion. Because of the torsion securing means, harmful rotary motions of the fifth wheel coupling pin resulting from vehicle operation are avoided.

In a preferred embodiment of an attachment arrangement according to the invention, the inner wall of the clamping opening is conically shaped. Because of the conical inner wall, when the clamping body is axially screwed onto the housing of the attachment arrangement, a securing body resting on the inner wall is pressed radially inward and is finally clamped in place between the inner wall and the securing portion of the fifth wheel coupling pin. The conical inner wall then acts as a ramp, which converts the axial motion of the clamping body with force amplification into a radial motion of the securing body.

In a preferred embodiment of the invention, the clamping body is embodied in lidlike fashion. This lends it especially good mechanical stability, and at the same time it can protect the interior of the housing and the securing portion of the fifth wheel coupling pin against becoming soiled.

The lidlike clamping body can be further improved by providing that a nonrotationally symmetrical protrusion protruding axially in the direction of the fifth wheel coupling pin is disposed in its middle and as a torsion securing means it engages a recess of complementary shape on the face end of the securing portion.

In an especially advantageous embodiment of the attachment arrangement, it is provided that the clamping body is provided with lateral threaded bores disposed substantially axially parallel to the fifth wheel coupling pin, into which bores threaded bolts are screwed, being inserted from the underside of the housing and passed through bores in the housing. This embodiment enables especially easy disassembly and assembly when the fifth wheel coupling pin is replaced.

The threaded bolt disposed in this way can in fact be loosened in a simple way from outside the semitrailer, and the clamping body is displaced axially upward. In this process, the securing body or securing bodies come out of engagement with the securing portion, so that the worn fifth wheel coupling pin can simply be pulled out at the bottom from the receiving opening of the housing. A new fifth wheel coupling pin can equally simply be inserted into the receiving opening from below and secured again by tightening the threaded bolt firmly.

The attachment arrangement is still further improved by the provision that the bores of the housing are embodied as stepped bores, and that the heads of the threaded bolts are countersunk in the stepped bores. Such countersunk threaded bores do not protrude outward at the bottom from the semitrailer, so that during vehicle operation on the one hand they are not in the way and on the other cannot be damaged.

In an advantageous embodiment, it is provided that the securing body is embodied substantially as a slotted sheath, which embraces the securing portion of the fifth wheel coupling pin and with its underside rests on the top of the housing, and that the top of the sheath, when the clamping body is screwed tight, is pressed by the conical inner wall of the clamping body into an encompassing annular groove of the securing portion, causing the sheath to overall assume a conical shape. Because of the sheathlike shape, the securing body can embrace the fifth wheel coupling pin and thus firmly clamp uniformly from all sides. Elastic deformability of the sheath is assured by the slot, and this on the one hand enables engagement of the encompassing annular groove of the securing portion and on the other when the clamping body is loosened puts the securing body back out of engagement with the securing portion.

An especially good clamping engagement in the annular groove is obtained by the provision that the inner wall of the sheath is widened conically in the region of the top of the sheath, so that the profile of the sheath is adapted to the profile of the annular groove.

In a preferred embodiment it is provided that the sheath has a plurality of noncontinuous slots, made from the top inward, which are distributed over the circumference substantially at equal angular intervals. The uniform disposition of a plurality of slots assures uniform deformability of the sheath into the conical shape as the clamping body is being screwed tightly. When the clamping body is loosened, the securing body will also largely resume its original rotationally symmetrical shape, because of the uniformly distributed slots.

A more readily deformable and "softer" securing body is obtained by the provision that further noncontinuous slots are made into the sheath from the underside. Here the diameter of the underside can also be adapted to the dimensions of the fifth wheel coupling pin and of the clamping body.

However, the adaptation of the diameter can be made easier in that a continuous slot that cuts open the sheath is provided.

In a further feature of the invention, the slots are widened radially toward the interior. As a result, the sheath on its top can adapt especially well to the smaller diameter of the annular groove in the securing portion of the fifth wheel coupling pin.

In an especially easily manufactured embodiment, it is provided that the slots extend parallel to the center axis of the sheath, originating at the top or underside of the sheath.

For especially good deformability of the sheath in order to adapt to the groove in the securing portion of the fifth wheel coupling pin, it is recommended that the slots extend in an oblique inclination to the center axis of the sheath, originating at the top or underside of the sheath.

This last embodiment can be improved still further in that the slots are inclined in different directions in alternation.

It is understood that not only the shapes mentioned individually for the bush are encompassed within the scope of the invention. In particular, the bush can be secured in its installed position by means of further features, for instance by a shoulder or collar encompassing it on the outside, which is form- or force-lockingly joined to the housing and prevents the bush from lifting relative to the housing, if the clamping body is thrust upward once the threaded bolt is loosened.

Further advantages and details of the invention will become apparent from the ensuing description of exemplary embodiments in conjunction with the drawings.

DESCRIPTION OF PREFERRED EMBODIMENTS

Figure 1:
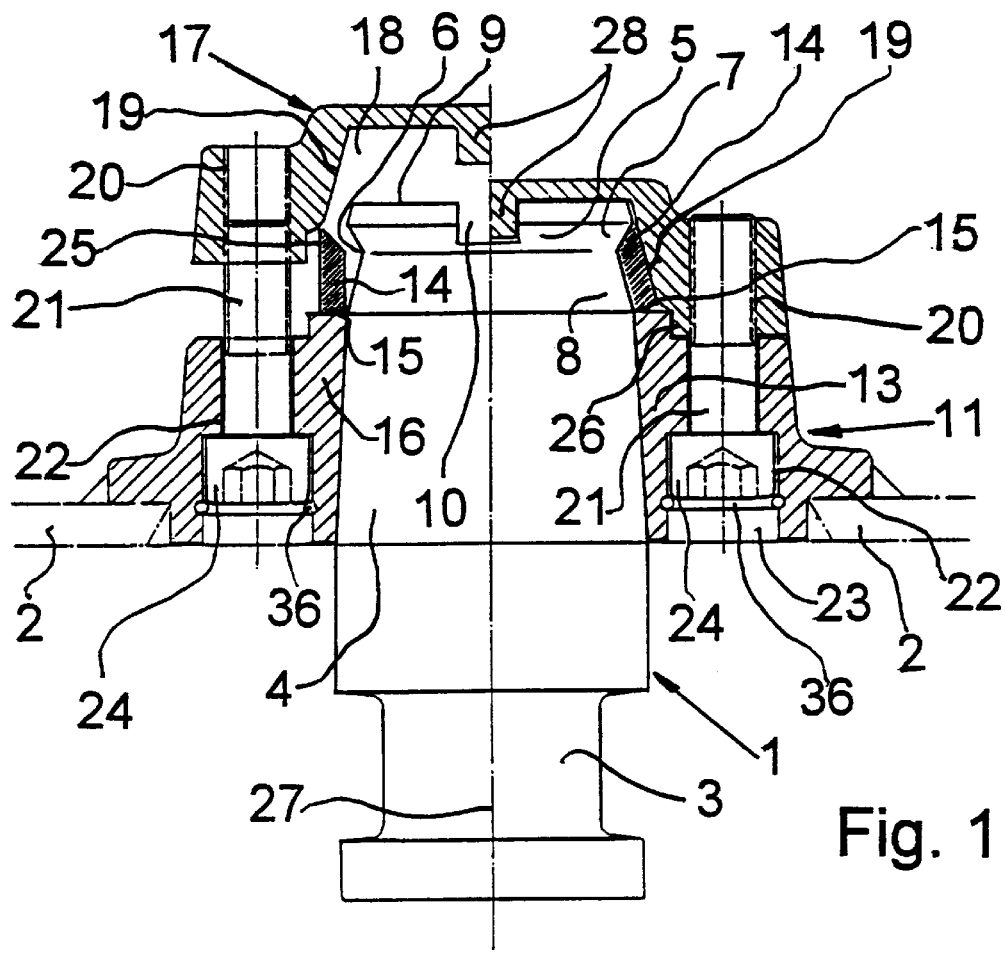
FIG. 1: a sectional view taken along the line A—A of FIG. 2 of an attachment arrangement according to the invention with a housing and a fifth wheel coupling pin.

In FIG. 1, a fifth wheel coupling pin 1 can be seen, which is used to connect a semitrailer 2, shown in only suggestion fashion, to a fifth wheel, not shown, of a tractor-trailer. To this end, the fifth wheel coupling pin 1 has a coupling portion 3, which comprises a plurality of cylindrical portions of various diameters, whose dimensions and arrangement are standardized, for instance in DIN Standard 47080 or ISO Standard 337. For hitching the semitrailer and the tractor-trailer together, the coupling portion 3 is introduced into the fifth wheel, where it is locked. The fifth wheel coupling pin 1 also has a centrally disposed conical support portion 4 and a securing portion 5, which has an encompassing annular groove 6 in the form of a constriction that is formed by two conical portions 7, 8. A nonrotationally symmetrical recess 10 for engagement by a torsion securing means is disposed on one face end 9 of the securing portion 5. Except for the recess 10, the entire fifth wheel coupling pin 1 is embodied rotationally symmetrically.

Figure 2:
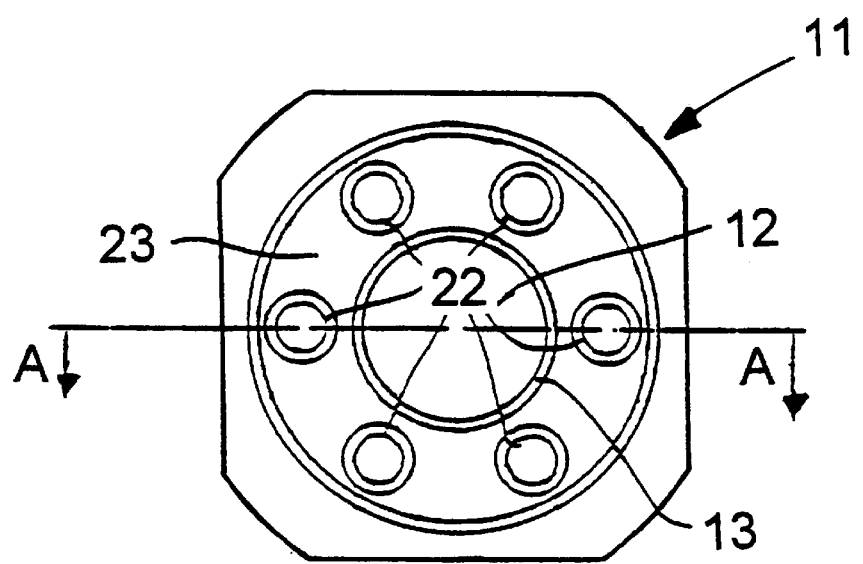
FIG. 2: a plan view from below on the unmounted housing.

The attachment arrangement shown in FIG. 1 has a housing 11, welded to the semitrailer 2, that is also shown in plan view in FIG. 2. The housing 11 has a continuous conical receiving opening 12 for receiving the support portion 4 of the fifth wheel coupling pin 1, which for assembly is inserted from below into the receiving opening 12 until the outer face of the conical support portion 4 is in firm contact with the conical inner wall 13 of complementary shape of the receiving opening 12. Via the conical inner wall 13, both the axially oriented force of gravity of the semitrailer 2 and the substantially radially oriented tensile forces or torques exerted by the tractor-trailer on the fifth wheel coupling pin 1 are transmitted.

The securing portion 5 of the fifth wheel coupling pin 1 protrudes out from the top of the inside of the housing 11 oriented toward the semitrailer. It is intended to secure the fifth wheel coupling pin 1 against falling axially out of the receiving opening 12. With the annular groove 6, the securing portion 5 has a lateral recess that is suitable for the form-locking engagement of a securing body 14.

The securing body 14 is shown in detail in FIGS. 3–9. As can be seen best in FIG. 3, the securing body is embodied substantially as a slotted sheath 14, which embraces the securing portion 5 of the fifth wheel coupling pin 1 and with its underside 15 rests on the top 16 of the housing 11.

A clamping body 17 of lidlike embodiment is also screwed onto the top 16 of the housing 11 and has a clamping opening 18 that narrows toward the face end 9 of the fifth wheel coupling pin 1, this opening having a conically shaped inner wall 19. The clamping opening 18 encloses the securing portion 5 of the fifth wheel coupling pin 1, and as shown in the right-hand portion of FIG. 1, the sheath 14 is clamped in place between the inner wall 19, the clamping opening 18, and the conical portions 7, 8 of the annular groove 6.

For the clamping, the clamping body 17 has six threaded bores 20, disposed laterally next to the fifth wheel coupling pin 1 and around it, and six threaded bolts 21 are screwed into these bores. The housing 11 has six stepped bores 22, into which the threaded bolts 21 are inserted from the underside 23 of the housing 11 and screwed into the threaded bores 20. The heads 24 of the threaded bolts 21 are countersunk in the stepped bores 22.

The situation before the threaded bolts 21 are tightened is shown in the left-hand portion of FIG. 1. At this time, the fifth wheel coupling pin 1 has already been inserted from below into the receiving opening 12. The sheath 14 surrounds the securing portion 5 but does not yet engage the annular groove 6. The clamping body 17 is still axially spaced apart from the top 16 of the housing 11. The top 25 of the sheath 14 rests with one edge on the inner wall 19 of the clamping opening 18.

When the threaded bolts 21 are now tightened, the clamping body 17 is pulled axially in the direction of the housing 11, whereupon the edge of the top 25 of the sheath 14 is pressed radially in the direction of the securing portion 5 of the fifth wheel coupling pin 1 by the incline of the conical inner wall 19 of the clamping opening 18, until finally, as shown on the right-hand side of FIG. 1, the sheath 14 is firmly clamped in place between the conical walls 7, 8 of the annular groove 6 and the inner wall 19 of the clamping body 17. The fifth wheel coupling pin 1 can now no longer move in the axial direction and is thereby secured against falling out of the receiving opening 12.

It is particularly worthy of note in the arrangement of the invention that the threaded bolts 21 need bring to bear only a slight axial force in order to firmly hold the clamping body 17 on the housing 11. Radial forces that might be exerted by the fifth wheel coupling pin 1 during vehicle operation and that under some circumstances may not be entirely absorbed by the receiving opening 12 of the housing 11 can still be transmitted to the clamping body 17 via the sheath 14 but do not stress the threaded bolts 21, since the clamping body 17 is form-lockingly connected in the radial direction to the housing 11 by an encompassing shoulder 26. The screw connection is therefore especially secure.

To prevent rotation of the fifth wheel coupling pin 1 about its longitudinal axis 27 as a consequence of vehicle operation, a nonrotationally symmetrical protrusion 28 protruding axially in the direction of the fifth wheel coupling pin 1 is disposed in the middle of the clamping body 17 and as a torsion securing means it engages the recess 10 of complementary shape on the face end 9 of the securing portion 5.

Figure 4:
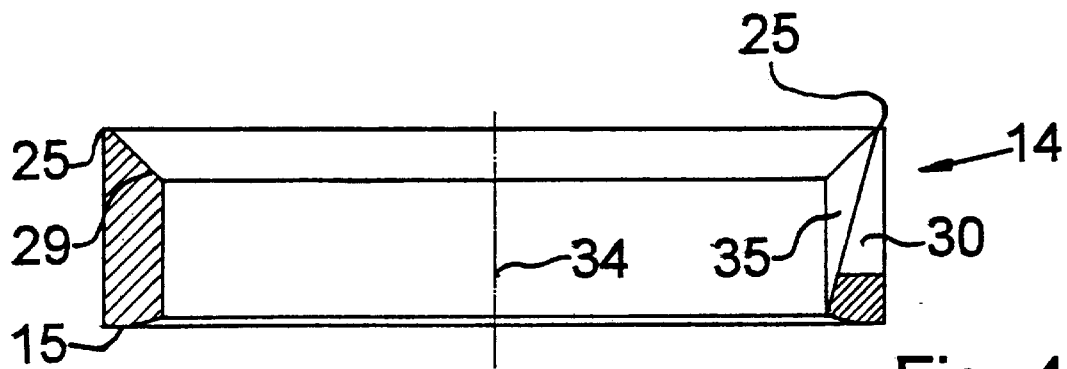
FIG. 4: a sectional view along the line B—B of the sheath of FIG. 3 in the unmounted state.
Figure 5:
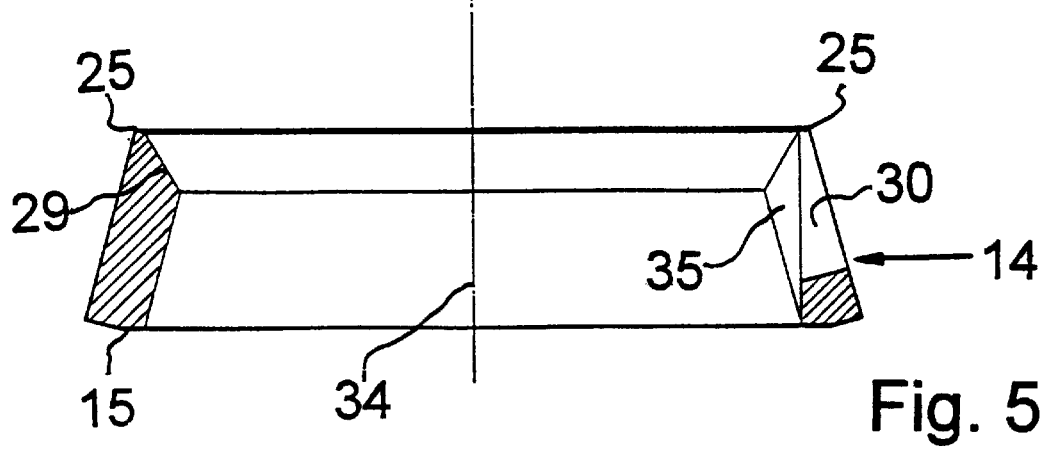
FIG. 5: the sheath of FIG. 4 in the mounted state.

As best seen in FIG. 4 or FIG. 5, the inner wall 29 of the sheath 14 is widened conically in the region of the top 25 so that in the clamped state (FIG. 5) the profile of the sheath 14 is adapted to the profile of the annular groove 6 (FIG. 1, right-hand side).

Figure 3:
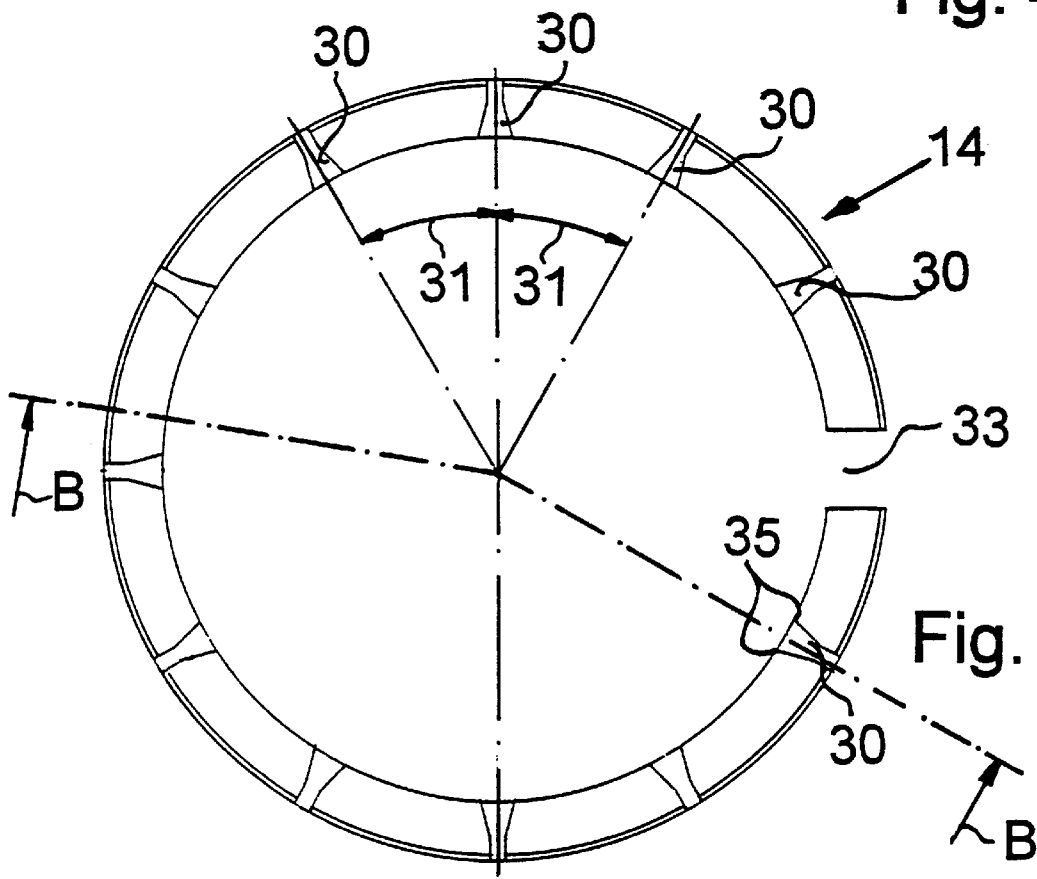
FIG. 3: a plan view on a securing body embodied as a slotted sheath.

As best seen in FIG. 3, the sheath 14 has a plurality of noncontinuous slots 30, made from the top 25 inward, which are distributed over the circumference substantially at equal angular intervals 31 of 30°. The slots 30 enable the compression of the top 25 of the sheath 14 into the conical overall shape shown in FIG. 5, in which the diameter of the top 25 is of course reduced. To enable an adaptation of the diameter of the underside 15 to the dimensions of the fifth wheel coupling pin 1 or clamping body 17 as well, a continuous slot 33 is provided, which opens the sheath 14.

Figure 7:
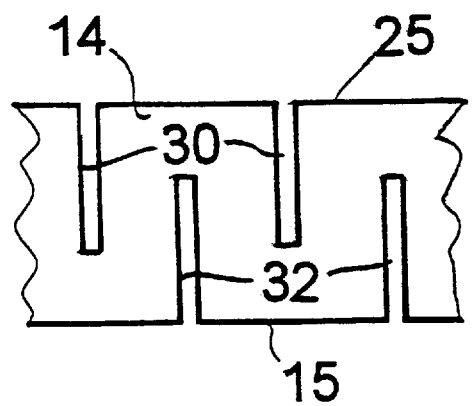

Another possible way of adapting the diameter of the underside 15 is to provide further slots 32, which are introduced into the sheath 14 from the underside 15. Such further slots 32 are schematically shown in FIGS. 7–9.

The adaptation of the sheath shape in the firmly clamped state to the shape of the annular groove 6 is improved still further in that the slots 30, 32 are widened radially toward the interior by means of chamfers 35.

Figure 6:
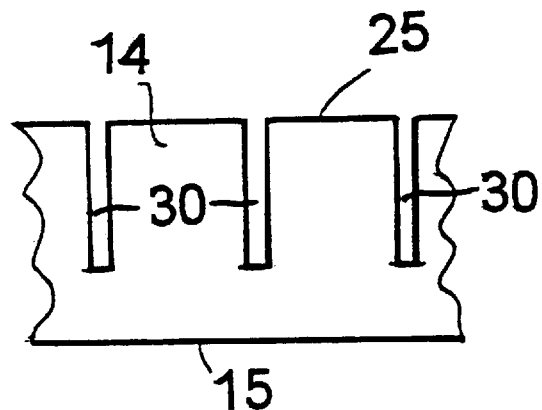
FIGS. 6–9: fragmentary views of the sheath from the side, with schematic illustrations of various arrangements of slots.

In FIGS. 6–9, advantageous arrangements of the slots 30, 32 are schematically shown. FIG. 6 relates to the embodiment also shown in FIGS. 3–5, in which the slots 30, 32 extend parallel to the center axis 34 of the sheath 14, originating at the top 25 of the sheath 14. In the embodiment shown in FIG. 7, both slots 30 introduced from the top 25 and slots 32 introduced from the underside 15 are disposed parallel to the center axis 34 of the sheath 14.

Figure 8:
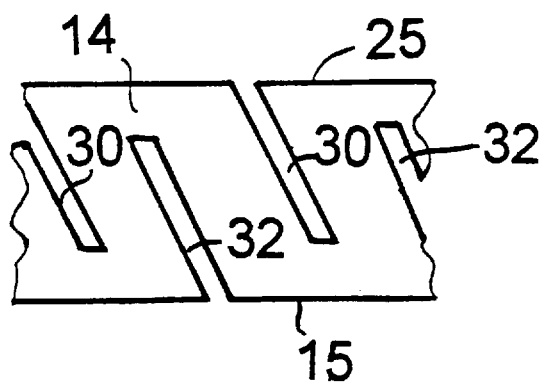
Figure 9:
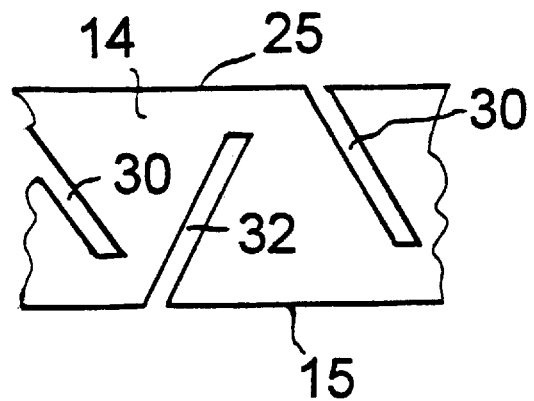

In FIGS. 8 and 9, the slots 30, 32 are inclined obliquely to the center axis 34 of the sheath 14, and the slots 30 introduced from the top 25 and the slots 32 introduced from the underside are inclined in the same direction in FIG. 8 and alternatingly in different directions in FIG. 9.

The sheath 14 of the invention comprises an elastic metal, and by means of the slots 30, 32, 33, an optimal adaptation can be made to the installed dimensions of the annular groove 6 of the fifth wheel coupling pin 1 and of the clamping opening 18 of the clamping body 17. Because of the elastic properties of the sheath 14, it is also especially easy to remove the fifth wheel coupling pin 1.

Steel is particularly highly suitable as material for the sheath 14, but plastic can also be considered with a view to economical manufacture. To reinforce an elastic restoration of the sheath 14 to its original basic shape when the fifth wheel coupling pin 1 is removed, it is recommended that the sheath 14 be coated with an elastomer material, in particular rubber, that fills up the slots 30 32, 33.

The removal can be done especially conveniently from the outside of the semitrailer 2 by loosening the threaded bolts 21. The threaded bolts 21 are axially retained in the stepped bore 22 by a snap ring 36, so that they cannot fall out at the bottom. When the threaded bolts 21 are loosened, they therefore press the clamping body 17 axially upward, causing the inner wall 19 of the clamping opening 18 to come out of engagement with the sheath 14. The sheath 14, because of its elasticity, then resumes the original cylindrical shape shown in FIG. 4. This situation is equivalent to what is shown on the left-hand side of FIG. 1. The worn fifth wheel coupling pin 1 can now simply be pulled out at the bottom from the receiving opening 12 and replaced with a spare part. The attachment of the new fifth wheel coupling pin 1 is then done, again by simply tightening the threaded bolts 21.

| List of Reference Numerals |
| --- |
| 1 Fifth wheel coupling pin |
| 2 Semitrailer |
| 3 Coupling portion |
| 4 Support portion |
| 5 Securing portion |
| 6 Annular groove |
| 7 Conical portion |
| 8 Conical portion |
| 9 Face end |
| 10 Recess |
| 11 Housing |
| 12 Receiving opening |
| 13 Inner wall |
| 14 Securing body/sheath |
| 15 Underside of the sheath |
| 16 Top of the housing |
| 17 Clamping body |
| 18 Clamping opening |
| 19 Inner wall |
| 20 Threaded bore |
| 21 Threaded bolt |
| 22 Stepped bore |
| 23 Underside of the housing |
| 24 Heads |
| 25 Top of the sheath |
| 26 Shoulder |
| 27 Longitudinal axis |
| 28 Protrusion |
| 29 Inner wall of the sheath |
| 30 Slots |
| 31 Angular spacing |
| 32 Further slots |
| 33 Continuous slot |
| 34 Center axis |

| -continued |
| --- |
| List of Reference Numerals |
| 35 Chamfers |
| 36 Snap ring |

What is claimed is:

1. An attachment arrangement for semitrailers, for connecting the semitrailer (2) to a fifth wheel of a tractor-trailer, comprising a fifth wheel coupling pin (1) having a coupling portion (3) for locking into the fifth wheel in detent fashion, having a support portion (4) for insert into a receiving opening (12) of the semitrailer (2), and having a securing portion (5) for securing the fifth wheel coupling pin (1) against falling axially out of the receiving opening (12), the securing portion (5) having at least one lateral recess (6); and a housing (11) for attachment to the semitrailer and having a continuous receiving opening (12) for receiving said support portion (4) of the fifth wheel coupling pin (1), and a top arranged so that a securing portion (5) of the fifth wheel coupling pin (1) protrudes out of the top (16) of the housing (11), a clamping body (17) screwed onto the top (16) of the housing (11) and enclosing the securing portion (5) with a clamping opening (18) that narrows toward the face end of a fifth wheel coupling pin (1), and at least one securing body (14) clamped in place between an inner wall (19) of the clamping opening (18) and said lateral recess (6) of the securing portion (5).

2. The attachment arrangement of claim 1, wherein the coupling pin is embodied substantially rotationally symmetrically, and that the support portion (4) is conical.

3. The attachment arrangement of claim 2, wherein the lateral recess is embodied as an encompassing annular groove (6).

4. The attachment arrangement of claim 3, wherein the groove walls are formed by two conical portions (7, 8), so that the annular groove (6) takes the form of a constriction.

5. The attachment arrangement of claim 1, wherein a nonrotationally symmetrical recess (10) for engagement by a torsion securing means (28) is provided on the face end (9) of the securing portion (5).

6. The attachment arrangement of claim 1, wherein the inner wall (19) of the clamping opening (18) is conically shaped.

7. The attachment arrangement of claim 6, wherein the securing body is embodied substantially as a slotted sheath (14), which embraces the securing portion (5) of the fifth wheel coupling pin (1) and with its underside (15) rests on the top (16) of the housing (11), and that the top (25) of the sheath (14), when the clamping body (17) is screwed tight, is pressed by the conical inner wall (19) of the clamping body into an encompassing annular groove (6) of the securing portion (5), causing the sheath (14) to assume a conical shape.

8. The attachment arrangement of claim 7, wherein the inner wall (29) of the sheath (14) is widened conically in the region of the top (25) of the sheath (14), so that the profile of the sheath (14) is adapted to the profile of the annular groove (6).

9. The attachment arrangement of claim 7, wherein the sheath (14) has a plurality of noncontinuous slots (30), made from the top (25) inward, which are distributed over the circumference substantially at equal angular intervals (31).

10. The attachment arrangement of claim 9, wherein further noncontinuous slots (32) are made into the sheath (14) from the underside (15).

11. The attachment arrangement of claim 9, wherein a continuous slot (33) is provided, which cuts open the sheath (14).

12. The attachment arrangement of claim 9, wherein the slots (30, 32) are widened radially toward the interior.

13. The attachment arrangement of claim 9, wherein the slots (30, 32) extend parallel to the center axis (34) of the sheath (14), originating at the top (25) or underside (15) of the sheath (14).

14. The attachment arrangement of claim 9, wherein the slots (30, 32) extend in an oblique inclination to the center axis (34) of the sheath (14), originating at the top (25) or underside (15) of the sheath (14).

15. The attachment arrangement of claim 14, wherein the slots (30, 32) are inclined in different directions in alternation.

16. The attachment arrangement of claim 1, wherein the clamping body (17) is embodied in lid shaped fashion.

17. The attachment arrangement of claim 16, wherein a nonrotationally symmetrical protrusion (28) protruding axially in the direction of the fifth wheel coupling pin (1) is disposed in the middle of the clamping body (17) and as a torsion securing means it engages a recess (10) of complementary shape on the face end (9) of the securing portion (5).

18. The attachment arrangement of claim 1, wherein the clamping body (17) is provided with lateral threaded bores (20) disposed substantially axially parallel to the fifth wheel coupling pin (1), into which bores threaded bolts (21) are screwed, being inserted from the underside (23) of the housing (11) and passed through bores (22) in the housing (11).

19. The attachment arrangement of claim 18, wherein the bores of the housing (11) are embodied as stepped bores (22), and that the heads (24) of the threaded bolts (21) are countersunk in the stepped bores (22).

* * * * *